United States Patent [19]
Kim

[11] Patent Number: 5,719,904
[45] Date of Patent: Feb. 17, 1998

[54] DATA RESTORING CIRCUIT

[75] Inventor: Jin-Gyu Kim, Suwon, Rep. of Korea

[73] Assignee: SamSung Electronics Co., Ltd., Suwon, Rep. of Korea

[21] Appl. No.: 542,968

[22] Filed: Oct. 13, 1995

[30] Foreign Application Priority Data

Oct. 13, 1994 [KR] Rep. of Korea .................. 1994-26244

[51] Int. Cl.[6] ................................................ H04L 7/02
[52] U.S. Cl. ........................ 375/362; 375/365; 370/513
[58] Field of Search ............................. 375/340, 346, 375/365, 362, 366, 224, 372, 226; 370/106, 105.4, 105.1, 513, 514

[56] References Cited

U.S. PATENT DOCUMENTS

| | | | |
|---|---|---|---|
| 4,432,094 | 2/1984 | Das Gupta . | |
| 4,686,676 | 8/1987 | McPherson . | |
| 4,709,376 | 11/1987 | Kage . | |
| 4,788,681 | 11/1988 | Thomas et al. | 370/503 |
| 4,890,304 | 12/1989 | Annamalai | 375/366 |
| 5,016,206 | 5/1991 | Shinonaga | 375/366 |
| 5,054,035 | 10/1991 | Tarallo et al. | 375/366 |
| 5,150,210 | 9/1992 | Hoshi et al. . | |

Primary Examiner—Tesfaldet Bocure
Assistant Examiner—Bryan Webster
Attorney, Agent, or Firm—Robert E. Bushnell, Esq.

[57] ABSTRACT

A data restoring circuit in a wireless communication system having a demodulator for demodulating a received signal supplied from a wireless signal receiver to generate a demodulated signal; a clock restoring section for restoring a clock signal from the demodulated signal so as to control overall operations of the circuit; a data restoring section for restoring data from the demodulated signal; a frame detector for establishing frame synchronization with successive frames of the restored data; a plurality of different memory banks for sequentially storing respective frame data of successive frames of the restored data in dependence upon the clock signal; a frame quality measuring section for monitoring the quality of each frame of said digital data in dependence upon the clock signal and generating a frame quality signal; and a determining section for generating true data of the received radio signal substantially free from errors which occur in the transmission path by adjusting values of said respective frame data of successive frames of the restored data stored in different memory banks corresponding to the frame quality signal.

23 Claims, 5 Drawing Sheets

FIG. 3

DATA RESTORING CIRCUIT

CROSS-REFERENCE TO RELATED APPLICATIONS

This application makes reference to, incorporates the same herein, and claims all benefits accruing under 35 U.S.C. §119 from an application for Circuit And Method For Restoring Data earlier filed in the Korean Industrial Property Office on 13 Oct. 1994 and there duly assigned Ser. No. 26244/1994.

BACKGROUND OF THE INVENTION

1. Technical Field

The present invention relates to a circuit for restoring true data from a noisy or distorted digital signal received in a wireless communication system by way a majority voting determination, and more particularly, relates to a circuit and a method for restoring true data in accordance with detection of a data quality.

2. Background Art

Generally, in a digital communication system, there are several known error detection and correction techniques such as, for example, conventional block coding and convolutional coding techniques, for detecting transmission errors such as bit or burst errors contained in a received radio signal which occur during transmission of such radio signal and restoring true data from the received radio signal. One such technique involves processing with a majority voting determination of repetitive digital signal so as to enhance reliability of information. Examples of this type of error coding technique are mentioned, in U.S. Pat. No. 4,432,094 for Method For Recognizing Digital Information Transmitted In A Mobile Radio Communication system issued to Das Gupta, U.S. Pat. No. 4,686,676 for Apparatus And Method For Determining True Data In A Digital Data Stream From Distorted Data issued to McPherson, and U.S. Pat. No. 4,709,376 for Received Signal Processing Apparatus issued to Kage. This kind of system is simpler than other known error detection and correction systems, and thus has been extensively used.

In such a system, a majority voting determination is provided to repeatedly transmit information an odd number of times at a transmitter station and correct data errors by taking bit data occupied by a majority of the information received by a receiver station, even though the data errors contained in the information occur during the transmission such as, for example, bit errors or burst errors which possibly occur in the transmission path due to fading, interference between adjacent channels and other causes. In this case, the magnitude of a received signal and stability of a data bit stream are significant factors in the detection of such data errors.

Conventional data restoring circuits employed such majority voting determination technique can only restore information which was transmitted under normal transmission condition. Under poor transmission conditions, however, they cannot restore information with high integrity and reliability primarily because they do not consider the transmission conditions in which information is transmitted at the transmitter station.

SUMMARY OF THE INVENTION

Accordingly, it is therefore an object of the present invention to provide an improved data restoring process and circuit.

It is another object to provide a novel data restoring circuit and a method for restoring true data of a received radio signal with a high degree of integrity and reliability.

It is also another object of the present invention to construct a novel data restoring circuit which takes into account the transmission conditions at a transmitter station during transmission and communication circumstances in which transmission errors are likely to occur in the transmission path due to fading and other causes.

To achieve the above and other objects, the present invention contemplates upon a data restoring circuit in a wireless communication system constructed according to the principle of the present invention with a demodulator for demodulating a received radio signal to generate a demodulated signal. A clock restoring section restores a clock signal from the demodulated signal and a data restoring section for restores digital data from the received radio signal in synchronization with the clock signal. A frame detector detects frame synchronization of successive frames of the digital data and respective frame data of successive frames of the digital data are seqentially stored in a plurality of memory banks in dependence upon the clock signal. A frame quality measuring section measures the quality of each frame of the digital data and generates a frame quality signal in dependence upon the clock signal. A determination section determines and generates true data corresponding to the received radio signal that is substantially free from errors occurring in the transmission path on the basis of logic operations of the frame data of successive frames of the digital data respectively stored in the memory banks and the corresponding frame quality signal.

The present invention also contemplates that the frame quality measuring section includes a zero crossing detector for setting a window period for determining whether the digital data contains a failing edge or a rising edge within the window period in response to a window clock signal corresponding to the clock signal shifted by one-half period and a zero crossing reset signal while a counter for counting a "good" signal from the zero crossing detector in response to reception of the clock signal and a counter enable signal. The zero crossing detector includes an edge detector for detecting whether a falling edge or a rising edge of the digital data is within the window period, and a logic section generates the "good" signal on the basis of logic operations of the output signals of the edge detector.

As specifically constructed according to the principles of the present invention, the zero crossing detector may use a first flip-flop having a first input terminal coupled to receive the window clock signal and a second input terminal coupled to receive the digital data, for generating, upon reset by the zero crossing reset signal, a first flip-flop signal exhibiting a high logic level when the rising edge of the digital data occurs during a logic "high" duration of the window clock signal; a second flip-flop having a first input terminal coupled to receive the window clock signal and a second input terminal coupled to receive an invert of the digital data, for generating a second flip-flop signal exhibiting the high logic level when the falling edge of the digital data occurs during a logic "high" duration of the window clock signal; a third flip-flop having a first input terminal coupled to receive an invert of the window clock signal and a second input terminal coupled to receive the digital data, for generating a third flip-flop signal exhibiting a low logic level when the falling edge of the digital data occurs during a logic "low" duration of the window clock signal; a fourth flip-flop having a first input terminal coupled to receive an invert of the window clock signal and a second input terminal coupled to receive an invert of the digital data, for generating a fourth flip-flop signal exhibiting the high logic level when the falling edge of the digital data occurs during a logic "low" duration of the window clock signal; an AND gate for logically combining the first and second flip-flop signals to generate a first logic signal; a logic device such as an OR gate for logically combining the third and fourth flip-flop signals to generate a second logic signal; and another logic device such as a NAND gate for logically combining the first and second logic signal to generate the "good" signal.

The present invention also contemplates that the determination section includes a plurality of latches for temporarily storing the frame quality signal corresponding to each frame respectively, when respective flame data of the digital are stored in the memory banks; a plurality of multipliers connected to the corresponding plurality of latches, for multiplying frame data of successive flames of the digital data stored in the memory banks by the flame quality signal of a corresponding frame; and an adder for generating true data of the received radio signal substantially flee from errors which occur during the transmission path by adding the outputs of said plurality of multipliers.

Also, as specifically constructed according to the principles of the present invention, the determination section may use a first latch for temporarily storing flame data of a first frame of the frame quality signal and providing a first latched signal corresponding said frame data of said first frame; a first multiplier for multiplying flame data of the digital data stored in a first memory bank by the first latched signal; a second latch for temporarily storing frame data of a second flame of the frame quality signal and providing a second latched signal corresponding flame data of the second flame; a second multiplier for multiplying frame data of the digital data stored in a second memory bank by the second latched signal; a third latch for temporarily storing flame data of a third frame of the frame quality signal and providing a second latched signal corresponding frame data of the third frame; a third multiplier for multiplying frame data of the digital data stored in a third memory bank by the third latched signal; and an adder for adding the outputs of the first, second, and third multipliers to generate true data of the received radio signal on a flame-by-frame basis.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 4A through 4I are diagrams showing waveforms of various input/output signals occuring in the data restoring circuit of FIG. 2; and FIGS. 5A through 5G are diagrams showing waveforms of various input/output signals occuring in the frame quality measuring section as shown in FIG. 2.

DETAILED DESCRIPTION OF THE PREFERRED EMBODIMENT

Figure 1:
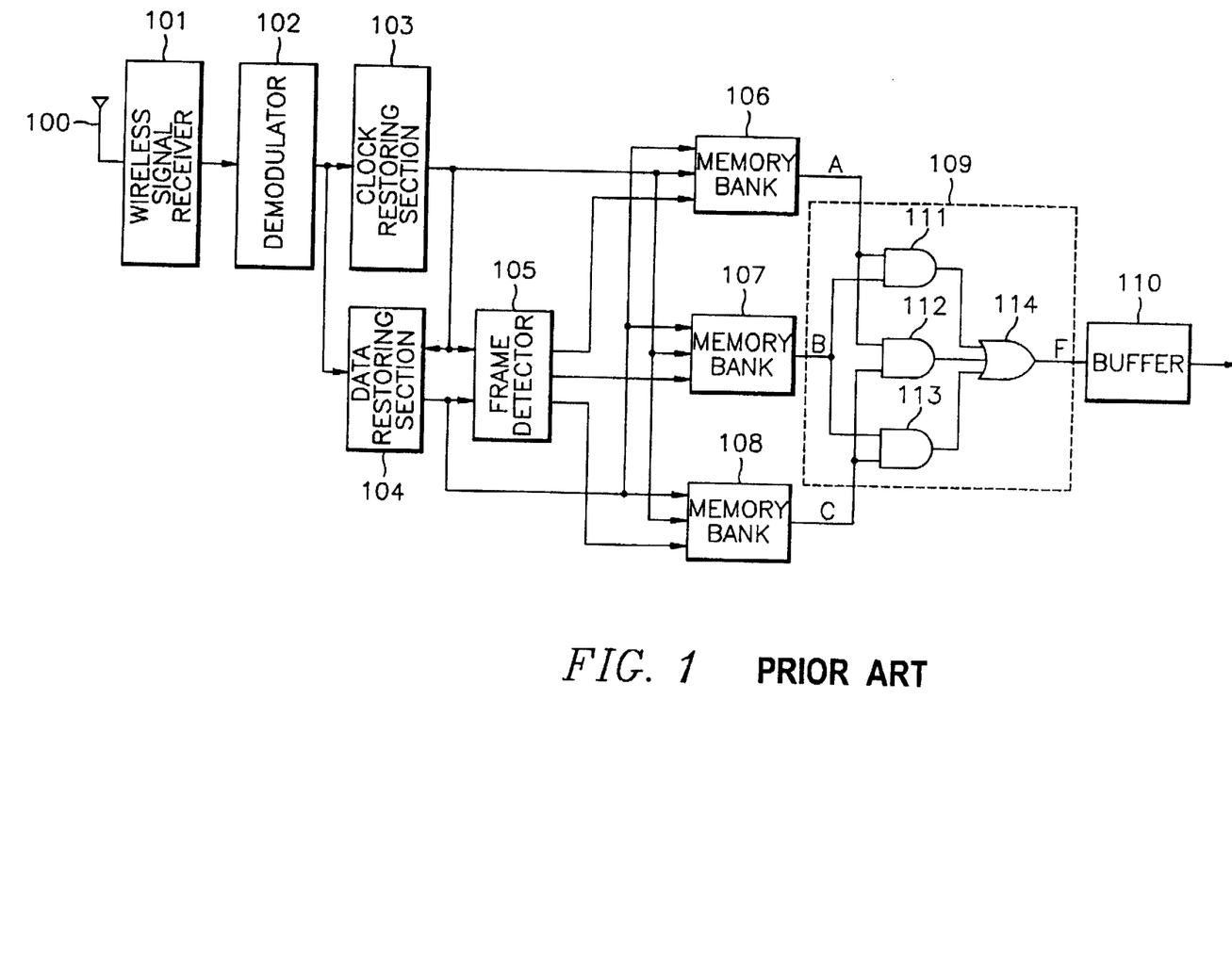
FIG. 1 provides an abstract illustration representing a salient aspects of a typical conventional data restoring circuit.

Referring now to the drawings and particularly to FIG. 1, which provides a representation of one type of data restoring circuit typically used to restore data from a received radio signal by making a majority voting determination from data of, for example, three successive frames stored in three respective memory banks. Such data restoring circuit typical includes a wireless signal receiver 101 for receiving a radio signal via an antenna 100, a demodulator 102 for demodulating a received radio signal to generate a demodulated signal, a clock restoring section 103 for restoring a clock signal from the demodulated signal, a data restoring section 104 for restoring digital data from the received radio signal, a frame detector 105 for establishing frame synchronization with successive frames of the digital data, at least three successive memory banks 106, 107, 108 for sequentially storing respective frame data of successive frames of the digital data in accordance with the clock signal and outputs of the frame detector 105, and a logic section 109 having three AND gates 111, 112, 113 and an OR gate 114 for making a majority voting determination between respective frame data A, B, and C stored in the three memory banks 106, 107, 108 and for generating data having a majority value as described in the following formula:

$$F=AB+AC+BC \tag{1}$$

Since the above majority voting determination of the conventional data restoring circuit takes no account of a communication circumstance, the determining logic section 109 is constantly controlled regardless whether respective frame data A, B and C represent true data or data plagued with transmission errors. Thus, conventional data restoring circuits can only restore data of a received radio signal which was transmitted under normal transmission condition. Under poor transmission conditions, however, they can not restore information with high integrity and reliability.

Figure 2:
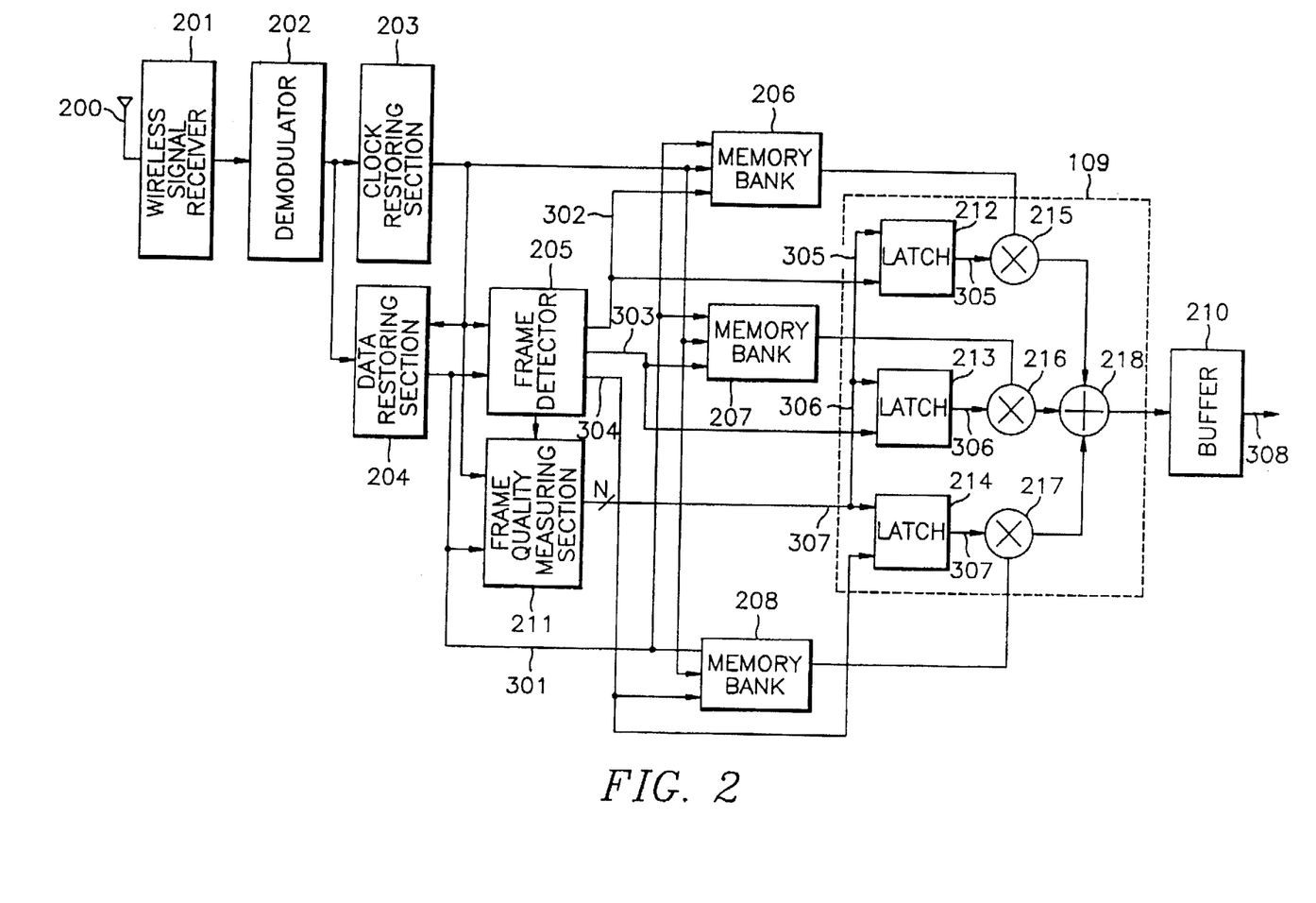
FIG. 2 illustrates a data restoring circuit as constructed according to the principles of the present invention.

Turning now to FIG. 2, a novel data restoring circuit as constructed according to the principles of the present invention is illustrated. The data restoring circuit comprises a wireless signal receiver for receiving a radio signal via an antenna 200; a demodulator 202 for demodulating a received radio signal supplied from the wireless signal receiver 201 to generate a demodulated signal; a clock restoring section 203 for restoring a clock signal from the demodulated signal and generating a restored clock signal and a window clock signal representing the restored clock signal shifted by one-half period as to control the overall operation of the circuit; a data restoring section 204 for restoring digital data from the demodulated signal; a frame detector 205 for receiving the restored clock signal from the clock restoring section 203 and detecting a starting signal of a frame from the data restoring section 204; a plurality of memory banks 206, 207, 208 for receiving the restored clock signal from the clock restoring section 203 and frame starting signals 302, 303, 304 from the frame detector 205 and sequentially storing the restored digital data from the data restoring section 204 in accordance with respective frame; a frame quality measuring section 211 for receiving the restored clock signal from the clock restoring section 203, frame control signals from the frame detector 205 and the restored digital data from the data restoring section 204, and for measuring the quality of each frame of the digital data to generate a frame quality signal; and a determining section 109 for determining resulted data representing true data of the received radio signal that is substantially free of transmission errors on the basis of logic operations of the restored digital data corresponding to each frame and the frame quality signal.

The determining section 109 has a maintaining section 212, 213, 214 for temporarily storing and outputting the frame quality signal from the frame quality measuring section 211 in response to the output signals of the frame detector 205, and a calculating section 215, 216, 217, 218 for determining the resulted data on the basis of logic operations of all the first data stored in the memory banks 206, 207, 208 and the frame quality signal of the corresponding frames.

The maintaining section 212, 213, 214 comprises a plurality of latches 212, 213, 214 for temporarily storing the frame quality signal of each corresponding frame in response to the output signals of the frame detector 205, when respective frame data is stored in the corresponding memory bank. The calculating section 215, 216, 217, 218 comprises a plurality of multipliers 215, 216, 217 for multiplying the restored data of each frame from the memory banks 206, 217, 208 by the frame quality signal of a corresponding frame from the maintaining section 212, 213, 214, and an adder 218 for adding output data of the multipliers 215, 216, 217. Output signal of the adder 218 is provided to determine accurate resulted data, because the quality of frame data transmitted several times is used to determine the received data.

Figure 3:
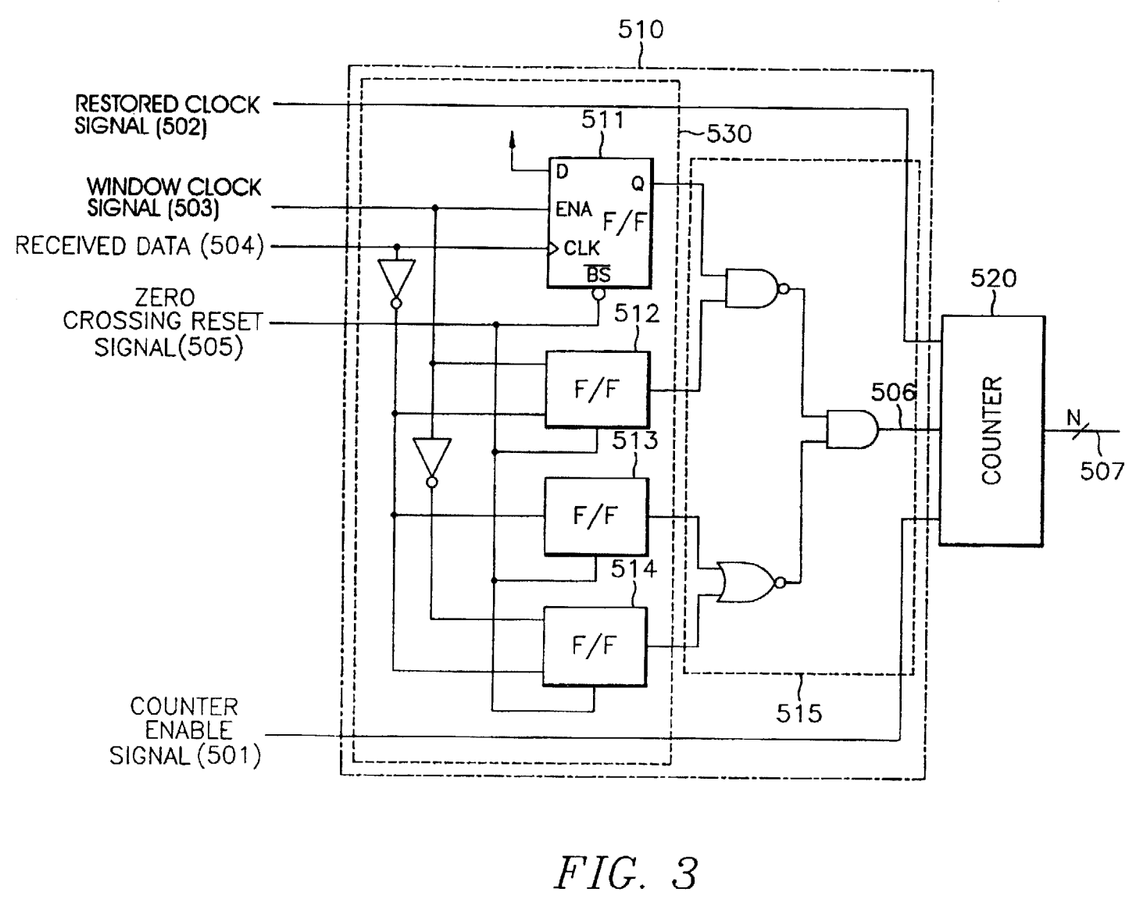
FIG. 3 illustrates a detailed circuit diagram of the frame quality measuring section as shown in FIG. 2.

FIG. 3 illustrates a detailed circuit diagram of the frame quality measuring section 211 as shown in FIG. 2. As shown in FIG. 3, the frame quality measuring section 211 comprises a zero crossing detector 510 for receiving the restored data of the data restoring section 204, a zero crossing reset signal 505 from the frame detector 205, and a window clock signal i.e., a ½ shifted clock signal of the restored clock signal to set a constant period i.e. a window period for monitoring whether the restored data contain a falling edge or a rising edge within the window period, and a counter 520 for receiving the restored clock signal from the clock restoring section 203 and a counter enable signal 501 from the frame detector 205 and for counting a "good" signal from the zero crossing detector 510.

The zero crossing detector comprises an edge detector 530 for detecting whether a falling edge or a rising edge of the restored data is within the window period, and a logic section 515 for outputting "good" data that is substantially free from errors which occur during transmission of the radio signal on the basis of logic operations of the output signals of the edge detector 530. The edge detector 530 receives the window clock signal 503 through an enable terminal thereof, the output signal 504 of the data restoring section 204 through a clock terminal thereof, and the output signal of the frame detector 205 through a reset terminal thereof, to detect whether an edge occurs within the window period.

Also, the frame quality measuring section 211 operates for each frame period in response to a counter enable signal 501 detected by the frame detector 21. The zero crossing detector 510 detects whether a rising edge or a falling edge is generated from the output data 504 of the data restoring section during a logic "high" or logic "low" period of the window clock signal 503 from the clock restoring section 203 using the edge detector 530, and determines whether that data corresponding to one clock period is normal, or not. Such data determination is further described as follows.

When there is a falling edge or a rising edge detected in the window, and there is no edge beyond the window, the data is determined as "good" data. When no edge is detected within and beyond the window, the data is determined as "good" data. If an edge is detected beyond the window, the data is determined as "bad" data. Also, if an edge is detected one or more times, the data is determined as "bad" data.

The detected signal as described above is obtained in accordance with the zero crossing reset signal 505 during one clock period only. The counter 520 counts the "good" signal from the zero crossing detector 510 during a period of the counter enable signal 501 and generates the frame quality signal corresponding to a frame period.

Figure 4A:
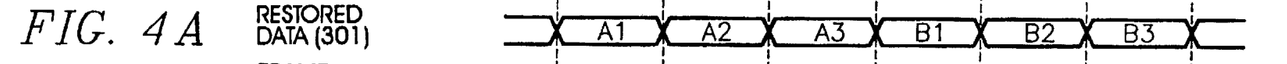
Figure 4B:
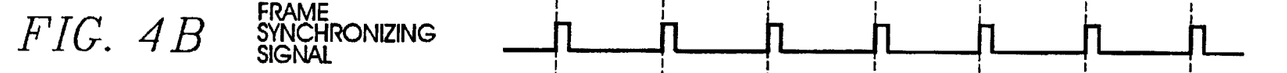
Figure 4C:
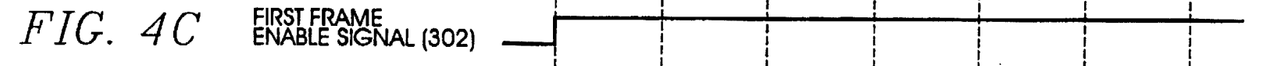
Figure 4D:
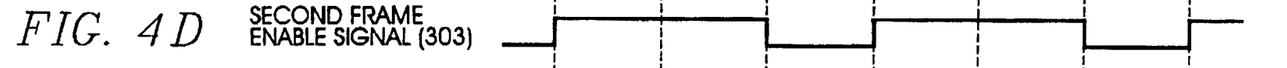
Figure 4E:
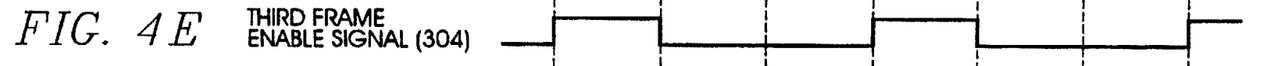
Figures 4F, 4G, 4H, 4I:
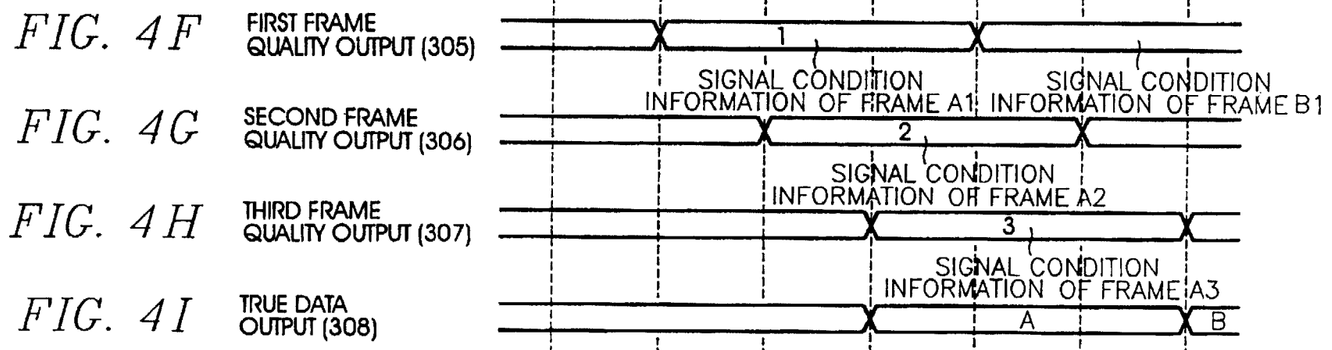

FIG. 4A shows a waveform of the restored data 301, 303, 304 of FIG. 2. FIG. 4B shows a waveform of a frame synchronizing signal detected by the frame detector 205; FIGS. 4C through 4E show waveforms of the memory enable signals 302, 303, 304 generated by the frame detector 205 for the memory banks 212, 213, 214, respectively; FIGS. 4F through 4H show waveforms of the output signals 305, 306, 307 of the frame quality measuring section 211; and FIG. 4I shows a waveform of a final output signal 308.

The data restoring operation adapted according to different communication circumstances will be described with reference to FIGS. 3 and 4 as follows.

Wireless signal (or radio signal) supplied from other communication systems is input to the data restoring circuit through an antenna 200 and is converted into a low frequency signal. The low frequency signal is demodulated by a demodulator 202 to be outputted as a baseband signal. In order for the baseband signal to be restored as stable data by a clock restoring section 203, acquisition and tracking operations are performed on the basis of the previous detection of edges of the baseband signal. As a result, clock signal is restored from the baseband signal. The restored clock signal is used to process all data hereinafter.

A data restoring section 204, on the other hand, outputs the restored data 301 as shown in FIG. 4A, by way of shaping the baseband signal in synchronization with the restored clock signal. The restored data 301 is applied to a frame detector 205 which detects a starting portion of each frame from the restored data and then generates the memory enable signals 302, 303, 304 of the frame memory banks 206, 207, 208 as shown in FIGS. 4C through 4E. The memory enable signals are then used to sequentially store the frame data in the frame memory banks 206, 207, 208. In addition, the frame detector 205 also generates a counter enable signal 501 for enabling the counter 520 of the frame quality measuring section 211 to count the "good" signal from the zero crossing detector 510 and to generate the frame quality signal.

The frame quality measuring section 211 detects whether an edge of each bit is in a desired window or not, integrates the detected results of one frame period to measure the stability of receiving frame information, and then outputs a digital value of corresponding the stable frame information.

Figure 5A:
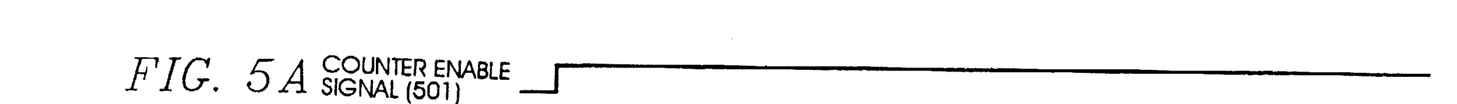
Figure 5B:
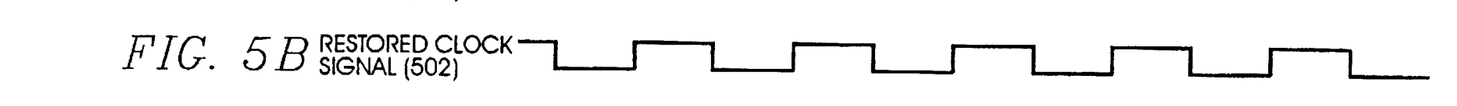
Figure 5C:
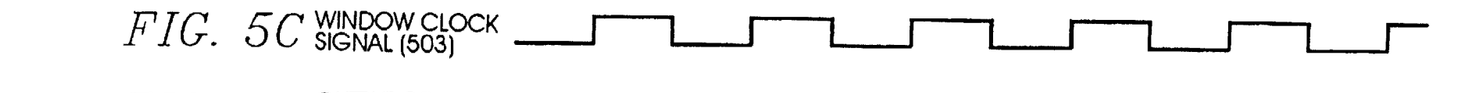
Figure 5D:
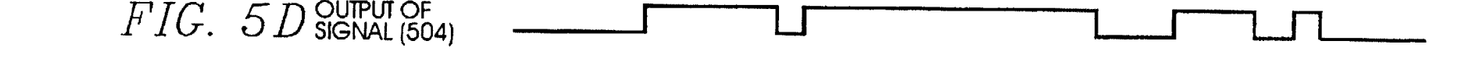
Figure 5E:
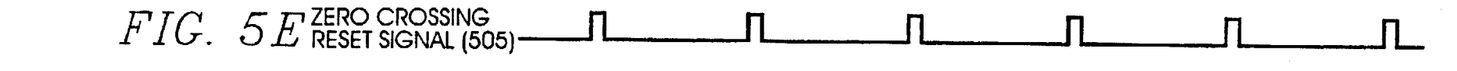

The clock signal restored by the clock restoring section 203 and the data restored by the data restoring section 204 are supplied to the frame detector 205 which detects the starting portion of each frame and outputs the counter enable signal 501 as shown in FIG. 5A to be maintained at a high level during one frame period and the memory bank enable signals 302, 303, 304. Then, the restored clock signal 502 from the clock restoring section 203 as shown in FIG. 5B and the window clock signal 503 i.e., a ½ shifted window clock signal as shown in FIG. 5C are supplied to an edge detector 530. The edge detector 530 receives the data 504 from the data restoring section 204 as shown in FIG. 5D and detects the edge. In case that the edge detector 530 does not detect an initial frame, a zero crossing reset signal 505 of a zero crossing section 510 as shown in FIG. 5E is at a logic "high" level, and thus an output signal of a logic section 515 is also at a logic "high" level based upon the logic operations of the outputs of the edge detector 530. When the edge detector 530 detects the initial frame, however, the zero crossing reset signal 505 of a logic "high" level is generated at the rising edge of the window clock signal 503, and thus the output signal of the edge detector 530 is at a logic "low" level. Flip-flop 511 outputs a high level signal through its output terminal when the rising edge occurs in the output signal of the data restoring section 204 during the window clock of a logic "high" level. Similarly, flip-flop 512 outputs a high level signal through its output terminal when the falling edge occurs in the output signal of the data restoring section 204 during the window clock of a logic "high" level. By contrast, flip-flop 513 outputs a low level signal through its output terminal when the falling edge occurs in the output signal of the data restoring section 204 during the window clock of a logic "low" level. Flip-flop 514 outputs a high level signal when the falling edge occurs in the output signal of the data restoring section 204 during the window clock of a logic "low" level. The logic section 515 receives the output signals of the flip-flops 511–514 and then outputs a high level signal only when no edge occurs in or beyond the window clock, or when only one edge (either a failing edge or a rising edge) is in the window clock. To output a high level signal from the logic section 515 means that data is stably received. Counter 520 then counts the high level signal from the logic section 515 and generates a frame quality signal corresponding to each frame of the restored data.

Figure 5F:
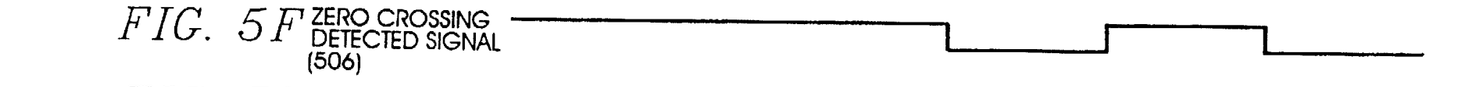
Figure 5G:
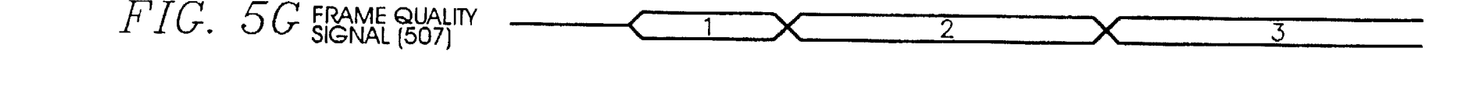

The zero crossing detected signal 506 from the logic section 515 as shown in FIG. 5F is used to determine the quality of the output data of respective memory banks 206, 207, 208 when the data stored in the memory banks 206, 207, 208 is processed on the basis of a majority voting logic function. The frame quality signal 507 as shown in FIG. 5G is supplied to latches 212, 213, 214 when respective frames are stored in the memory banks 206, 207, 208 in response to the memory bank enable signals 302, 303, 304, and thus respective frame data are maintained by the latches 212, 213, 214. Then, if respective frame data are stored in the respective memory bank 206, 207, 208, first data in the respective memory banks 206, 207, 208 are outputted in response to the restored clock signal 502, and then are supplied to respective multipliers 215, 216, 217 to be multiplied by the frame quality signals 305, 306, 307 of corresponding frames at output terminals of the latches 212, 213, 214. The frame quality signals 305, 306, 307 of corresponding frames are digital values representing the received frame signal. By multiplication, weighted value is added to the restored data in accordance with the condition of each received frame. The output signals of the multipliers 215–217 are added with each other by an adder 218. The added data 308 from the adder 218 is output through a buffer 210.

As described above, if the frame quality signal is determined as a "good" signal, the output signals of the memory banks 206, 207, 208 are determined as stable information. As a result, weighted values are added to the output data of the memory banks 206, 207, 208. If not however, relatively low weighted values are added to the output data of the memory banks 206, 207, 208. Accordingly, reliable data can be restored.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A data restoring circuit in a wireless communication system, comprising:

a receiver for receiving a radio signal via an antenna;

the demodulator for demodulating a received radio signal to generate a demodulated signal;

a restoring section for restoring a clock signal and digital data from the demodulated signal in synchronization with said clock signal;

a frame detector for establishing frame synchronization with successive frames of said digital data and generating memory enable signals;

a plurality of memory banks for sequentially storing successive frames of said digital data in accordance with said clock signal and said memory enable signals;

a frame quality measuring section for measuring the quality of each frame of said digital data in dependence upon said clock signal and generating a frame quality signal corresponding to each frame of said digital data; and a determining section for determining true data of said received radio signal from said digital data that is substantially free from errors on the basis of logic operations of said successive frames of said digital data respectively stored in said memory banks and said frame quality signal corresponding to each frame of said digital data.

2. The data restoring circuit of claim 1, wherein said determining section comprises:

a plurality of latches for temporarily storing said frame quality signal of corresponding frames when successive frames of said digital data are stored in corresponding memory banks, and for generating said frame quality signal corresponding to each frame of said digital data in response to reception of frame enable signals, respectively;

a plurality of multipliers correspondingly connected to said plurality of latches, for multiplying said digital data of successive frames respectively stored in said memory banks by said frame quality signal of corresponding frames; and an adder for generating said true data of said received radio signal on the basis of said digital data of successive frames and said frame quality signal corresponding to each frame of said digital data.

3. The data restoring circuit of claim 1, wherein said frame quality measuring section comprises:

a zero crossing detector having a designated window for generating a zero crossing detected signal by determining whether said digital data of each frame contains one of a failing and rising edge within said designated window in accordance with a window clock signal and a zero crossing reset signal, said window clock signal corresponding to said clock signal shifted by one-half period; and a counter responsive to said clock signal and a counter enable signal, for counting said zero crossing detected signal and generating said frame quality signal corresponding to each frame of said digital data.

4. The data restoring circuit of claim 3, wherein said zero crossing detector comprises:

an edge detector for detecting whether said failing edge or said rising edge of said digital data is within said window; and a logic section for outputting said zero crossing detected signal on the basis of logic operations of the outputs of said edge detector.

5. The data restoring circuit of claim 4, wherein said edge detector comprises:

a first flip-flop having a first input terminal coupled to receive said window clock signal and a second input terminal coupled to receive said digital data, for generating, upon reset by said zero crossing reset signal, a first flip-flop signal exhibiting a high logic level when the rising edge of said digital data occurs during a first logic duration of said window clock signal;

a second flip-flop having a first input terminal coupled to receive said window clock signal and a second input terminal coupled to receive an invert of said digital data, for generating, upon reset by said zero crossing reset signal, a second flip-flop signal exhibiting said high logic level when the falling edge of said digital data occurs during said first logic duration of said window clock signal;

a third flip-flop having a first input terminal coupled to receive an invert of said window clock signal and a second input terminal coupled to receive said digital data, for generating, upon reset by said zero crossing reset signal a third flip-flop signal exhibiting a low logic level when the falling edge of said digital data occurs during a second logic duration of said window clock signal complementary to said first logic duration; and a fourth flip-flop having a first input terminal coupled to receive an invert of said window clock signal and a second input terminal coupled to receive an invert of said digital data, for generating, upon reset by said zero crossing reset signal, a fourth flip-flop signal exhibiting said high logic level when the falling edge of said digital data occurs during said second logic duration of said window clock signal.

6. The data restoring circuit of claim 5, wherein said logic section comprises:

an AND gate for logically combining said first and second flip-flop signals to generate a first logic signal;

an OR gate for logically combining said third and fourth flip-flop signals to generate a second logic signal; and a NAND gate for logically combining said first and second logic signal to generate said zero crossing detected signal.

7. The data restoring circuit of claim 3, wherein said zero crossing detector comprises:

a first flip-flop having a first input terminal coupled to receive said window clock signal and a second input terminal coupled to receive said digital data, for generating, upon reset by said zero crossing reset signal, a first flip-flop signal exhibiting a high logic level when the rising edge of said digital data occurs during a first logic duration of said window clock signal;

a second flip-flop having a first input terminal coupled to receive said window clock signal and a second input terminal coupled to receive an invert of said digital data, for generating, upon reset by said zero crossing reset signal, a second flip-flop signal exhibiting said high logic level when the failing edge of said digital data occurs during said first logic duration of said window clock signal;

a third flip-flop having a first input terminal coupled to receive an invert of said window clock signal and a second input terminal coupled to receive said digital data, for generating, upon reset by said zero crossing reset signal, a third flip-flop signal exhibiting a low logic level when the falling edge of said digital data occurs during a second logic duration of said window clock signal complementary to said first logic duration;

a fourth flip-flop having a first input terminal coupled to receive an invert of said window clock signal and a second input terminal coupled to receive an invert of said digital data, for generating, upon reset by said zero crossing reset signal, a fourth flip-flop signal exhibiting said high logic level when the falling edge of said digital data occurs during said second logic duration of said window clock signal;

an AND gate for logically combining said first and second flip-flop signals to generate a first logic signal;

an OR gate for logically combining said third and fourth flip-flop signals to generate a second logic signal; and a NAND gate for logically combining said first and second logic signal to generate said zero crossing detected signal.

8. The data restoring circuit of claim 7, wherein said determining means comprises:

a first latch for temporarily storing said frame quality signal of a first frame, and providing a first latched signal in response to a first one of said memory enable signals;

a first multiplier for multiplying said frame data of said digital data stored in a first memory bank of said plurality of memory banks by said first latched signal to generate a first multiple signal;

a second latch for temporarily storing said frame quality signal of a second frame following said first frame, and providing a second latched signal in response to a second one of said memory enable signals;

a second multiplier for multiplying said frame data of said digital data stored in a second memory bank of said plurality of memory banks by said second latched signal to generate a second multiple signal;

a third latch for temporarily storing said frame quality signal of a third frame following said second frame, and providing a second latched signal in response to a third one of said memory enable signals;

a third multiplier for multiplying said frame data of said digital data stored in a third memory bank of said plurality of memory banks by said third latched signal to generate a third multiple signal; and an adder for adding said first, second, and third multiple signals to generate said true data of said received radio signal on a frame-by-frame basis.

9. A data restoring circuit in a wireless communication system, comprising:

demodulator means for demodulating a received radio signal to generate a demodulated signal;

means for restoring a clock signal and digital data from said demodulated signal;

frame detector means for establishing frame synchronization with successive frames of said digital data;

a plurality of different addressable memory locations for sequentially storing respective frame data of successive frames of said digital data in dependence upon said clock signal;

frame quality measuring means for monitoring the quality of each frame of said digital data in dependence upon said clock signal and generating a frame quality signal corresponding to each frame of said digital data; and determining means for determining true data from said received radio signal that is substantially free from transmission errors by adjusting values of said respective fame data of successive frames of said digital data stored in said plurality of different addressable memory locations in dependence upon said frame quality signal.

10. The data restoring circuit of claim 9, wherein said frame quality measuring means comprises:

zero crossing detector means for generating a zero crossing detected signal upon making a determination whether said digital data of each frame contain one of a falling and rising edge within a designated window in accordance with a window clock signal and a zero crossing reset signal, said window clock signal corresponding said clock signal shifted by one-half period; and counter means responsive to said clock signal and a counter enable signal, for counting said zero crossing detected signal and thereby generating said frame quality signal.

11. The data restoring circuit of claim 10, wherein said zero crossing detector means comprises:

edge detector means for detecting whether said falling edge and said rising edge of said digital data of each frame is within said designated window; and logic means for generating said zero crossing detected signal on the basis of logic operations of the outputs of said edge detector means.

12. The data restoring circuit of claim 11, wherein said edge detector means comprises:

a first flip-flop having a first input terminal coupled to receive said window clock signal and a second input terminal coupled to receive said digital data, for generating, upon reset by said zero crossing reset signal, a first flip-flop signal exhibiting a high logic level when the rising edge of said digital data occurs during a first logic duration of said window clock signal;

a second flip-flop having a first input terminal coupled to receive said window clock signal and a second input terminal coupled to receive an invert of said digital data, for generating, upon reset by said zero crossing reset signal, a second flip-flop signal exhibiting said high logic level when the falling edge of said digital data occurs during said first logic duration of said window clock signal;

a third flip-flop having a first input terminal coupled to receive an invert of said window clock signal and a second input terminal coupled to receive said digital data, for generating, upon reset by said zero crossing reset signal, a third flip-flop signal exhibiting a low logic level when the falling edge of said digital data occurs during a second logic duration of said window clock signal complementary to said first logic duration; and a fourth flip-flop having a first input terminal coupled to receive an invert of said window clock signal and a second input terminal coupled to receive an invert of said digital data, for generating, upon reset by said zero crossing reset signal, a fourth flip-flop signal exhibiting said high logic level when the falling edge of said digital data occurs during said second logic duration of said window clock signal.

13. The data restoring circuit of claim 12, wherein said logic means comprises:

first gating means for logically combining said first and second flip-flop signals to generate a first logic signal;

second gating means for logically combining said third and fourth flip-flop signals to generate a second logic signal; and third gating means for logically combining said first and second logic signal to generate said zero crossing detected signal.

14. The data restoring circuit of claim 11, wherein said zero crossing detector means comprises:

a first flip-flop having a first input terminal coupled to receive said window clock signal and a second input terminal coupled to receive said digital data, for generating, upon reset by said zero crossing reset signal, a first flip-flop signal exhibiting a high logic level when the rising edge of said digital data occurs during a first logic duration of said window clock signal;

a second flip-flop having a first input terminal coupled to receive said window clock signal and a second input terminal coupled to receive an invert of said digital data, for generating, upon reset by said zero crossing reset signal, a second flip-flop signal exhibiting said high logic level when the falling edge of said digital data occurs during said first logic duration of said window clock signal;

a third flip-flop having a first input terminal coupled to receive an invert of said window clock signal and a second input terminal coupled to receive said digital data, for generating, upon reset by said zero crossing reset signal, a third flip-flop signal exhibiting a low logic level when the falling edge of said digital data occurs during a second logic duration of said window clock signal complementary to said first logic duration;

a fourth flip-flop having a first input terminal coupled to receive an invert of said window clock signal and a second input terminal coupled to receive an invert of said digital data, for generating, upon reset by said zero crossing reset signal a fourth flip-flop signal, exhibiting said high logic level when the falling edge of said digital data occurs during said second logic duration of said window clock signal;

an AND gate for logically combining said first and second flip-flop signals to generate a first logic signal;

an OR gate for logically combining said third and fourth flip-flop signals to generate a second logic signal; and a NAND gate for logically combining said first and second logic signal to generate said zero crossing detected signal.

15. The data restoring circuit of claim 11, wherein said determining means comprises:

a plurality of latches for temporarily storing said frame quality signal corresponding to each frame respectively, when respective frame data of successive frames are stored in said different addressable memory locations, and generating said frame quality signal in response to reception of memory enable signals;

a plurality of multipliers correspondingly connected to said plurality of latches, for multiplying said frame data of successive frames stored in said different addressable memory locations and said frame quality signal of corresponding frames; and an adder for generating said true data of said received radio signal that is substantially free from transmission errors by adding the outputs of said plurality of multipliers.

16. The data restoring circuit of claim 11, wherein said determining means comprises:

a first latch for temporarily storing said frame quality signal of a first frame, and providing a first latched signal in response to a first frame enable signal;

a first multiplier for multiplying said frame data of said digital data stored in a first memory location of said plurality of different addressable memory locations by said first latched signal to generate a first multiple signal;

a second latch for temporarily storing said frame quality signal of a second frame following said first frame, and providing a second latched signal in response to a second frame enable signal;

a second multiplier for multiplying said frame data of said digital data stored in a second memory location of said plurality of different addressable memory locations by said second latched signal to generate a second multiple signal;

a third latch for temporarily storing said frame quality signal of a third frame following said second frame, and providing a second latched signal in response to a third frame enable signal;

a third multiplier for multiplying said frame data of said digital data stored in a third memory location of said plurality of different addressable memory locations by said third latched signal to generate a third multiple signal; and an adder for adding said first, second, and third multiple signals to generate said true data of said received radio signal on a frame-by-frame basis.

17. The data restoring circuit of claim 14, wherein said determining means comprises:

a first latch for temporarily storing said frame quality signal of a first frame, and providing a first latched signal in response to a first frame enable signal;

a first multiplier for multiplying said frame data of said digital data stored in a first memory location of said plurality of different addressable memory locations by said first latched signal to generate a first multiple signal;

a second latch for temporarily storing said frame quality signal of a second frame following said first frame, and providing a second latched signal;

a second multiplier for multiplying said frame data of said digital data stored in a second memory location of said plurality of different addressable memory locations by said second latched signal to generate a second multiple signal;

a third latch for temporarily storing said frame quality signal of a third frame following said second frame, and providing a second latched signal in response to a third frame enable signal;

a third multiplier for multiplying said frame data of said digital data stored in a third memory location of said plurality of different addressable memory locations by said third latched signal to generate a third multiple signal; and an adder for adding said first, second, and third multiple signals to generate said true data of said received radio signal on a frame-by-frame basis.

18. A data restoring method in a wireless communication system, comprising the steps of:

receiving a radio signal via an antenna;

demodulating a received radio signal to generate a demodulated signal;

restoring a clock signal and digital data from said demodulated signal;

sequentially storing respective frame data of successive frames of said digital data in a plurality of different memory banks in dependence upon said clock signal;

monitoring the quality of each frame of said digital data in dependence upon said clock signal and generating a frame quality signal by determining whether said digital data of each frame contain one of a falling edge and rising edge within a designated window in accordance with a window clock signal corresponding said clock signal shifted by one-half period; and generating true data from said received radio signal substantially free from transmission errors by adjusting values of said respective frame data of successive frames of said digital data stored in said plurality of different memory banks in dependence upon said frame quality signal.

19. A data restoring circuit, comprising:

a receiver for receiving a radio signal;

means for restoring a clock signal and digital data in successive frames from said radio signal;

frame detector means for establishing frame synchronization with successive frames of said digital data;

memory means comprising a plurality of different addressable memory locations for sequentially storing respective frame data of successive frames of said digital data in dependence upon said clock signal;

frame quality measuring means for monitoring the quality of each frame of said digital data in dependence upon said clock signal and generating a frame quality signal, said frame quality measuring means including a zero crossing detector for determining whether said digital data of each frame contain one of a falling and rising edge within a designated window, and a counter for counting an output of said zero crossing detector to thereby generate said frame quality signal designating said digital data of a corresponding frame as good data when no edge is detected within and beyond said designated window and alternatively designating said digital data of the corresponding frame as bad data whenever either an edge is detected beyond said designated window or whenever an edge is detected more than once within said designated window; and determining means for generating true data from said radio signal that is substantially free of transmission errors by adjusting values of said respective frame data for successive frames of said digital data stored in said plurality of different addressable memory locations in dependence upon designation of said frame quality signal of the corresponding frame as one of good data and bad data.

20. The data restoring circuit of claim 19, further comprised of said zero crossing detector comprising:

an edge detector for detecting whether said falling edge and said rising edge of said digital data of each frame is within said designated window; and a logic section for generating said output on the basis of logic operations of the outputs of said edge detector.

21. The data restoring circuit of claim 19, further comprised of said edge detector comprising:

a flip-flop having a first input terminal coupled to receive a window clock signal corresponding to said clock signal shifted by one-half period and a second input terminal coupled to receive said digital data, for generating, upon reset by a zero crossing reset signal generated from said frame detector means, a first flip-flop signal exhibiting a high logic level when the rising edge of said digital data occurs during a first logic duration of said window clock signal;

a second flip-flop having a first input terminal coupled to receive said window clock signal and a second input terminal coupled to receive an invert of said digital data, for generating, upon reset by said zero crossing reset signal, a second flip-flop signal exhibiting said high logic level when the falling edge of said digital data occurs during said first logic duration of said window clock signal;

a third flip-flop having a first input terminal coupled to receive an invert of said window clock signal and a second input terminal coupled to receive said digital data, for generating, upon reset by said zero crossing reset signal, a third flip-flop signal exhibiting a low logic level when the falling edge of said digital data occurs during a second logic duration of said window clock signal complementary to said first logic duration; and a fourth flip-flop having a first input terminal coupled to receive an invert of said window clock signal and a second input terminal coupled to receive an invert of said digital data, for generating, upon reset by said zero crossing reset signal, a fourth flip-flop signal exhibiting said high logic level when the falling edge of said digital data occurs during said second logic duration of said window clock signal.

22. The data restoring circuit of claim 19, further comprised of said logic section comprising:

and AND gate for logically combining said first and second flip-flop signals to generate a first logic signal;

an OR gate for logically combining said third and fourth flip-flop signals to generate a second logic signal; and a NAND gate for logically combining said first and second logic signal to generate said zero crossing detected signal.

23. The data restoring circuit of claim 19, further comprised of said determining means comprising:

a plurality of latches for temporarily storing said frame quality signal corresponding to each frame respectively, when respective frame data are stored in different memory locations, and for generating said frame quality signal in response to reception of memory enable signals;

a plurality of multipliers correspondingly connected to said plurality of latches, for multiplying said frame data of successive frames of said digital data stored in said different memory locations and said frame quality signal of corresponding frames; and an adder for generating said true data of said radio signal that is substantially free from transmission errors by adding the outputs of said plurality of multipliers.

* * * * *